Figure 5:
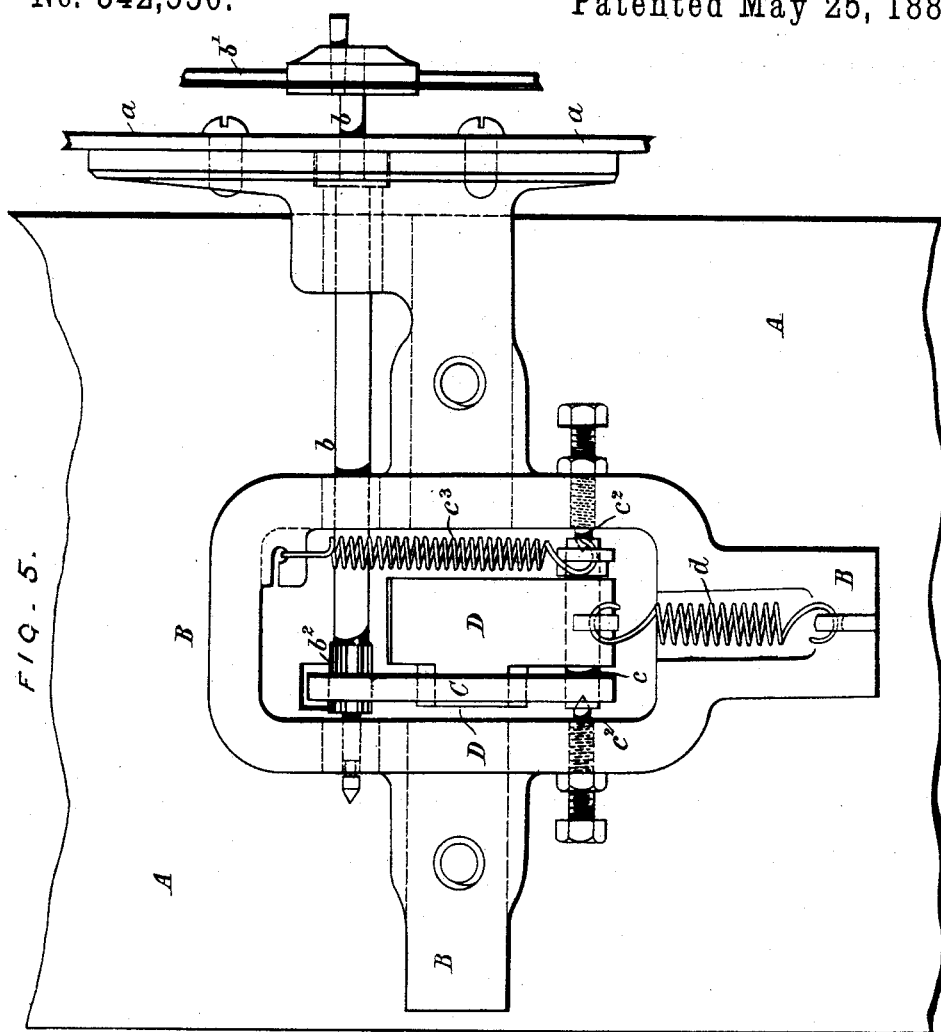

(No Model.) 9 Sheets—Sheet 1.
T. H. WARD.
WEIGHING AND INDICATING APPARATUS.
No. 342,550. Patented May 25, 1886.
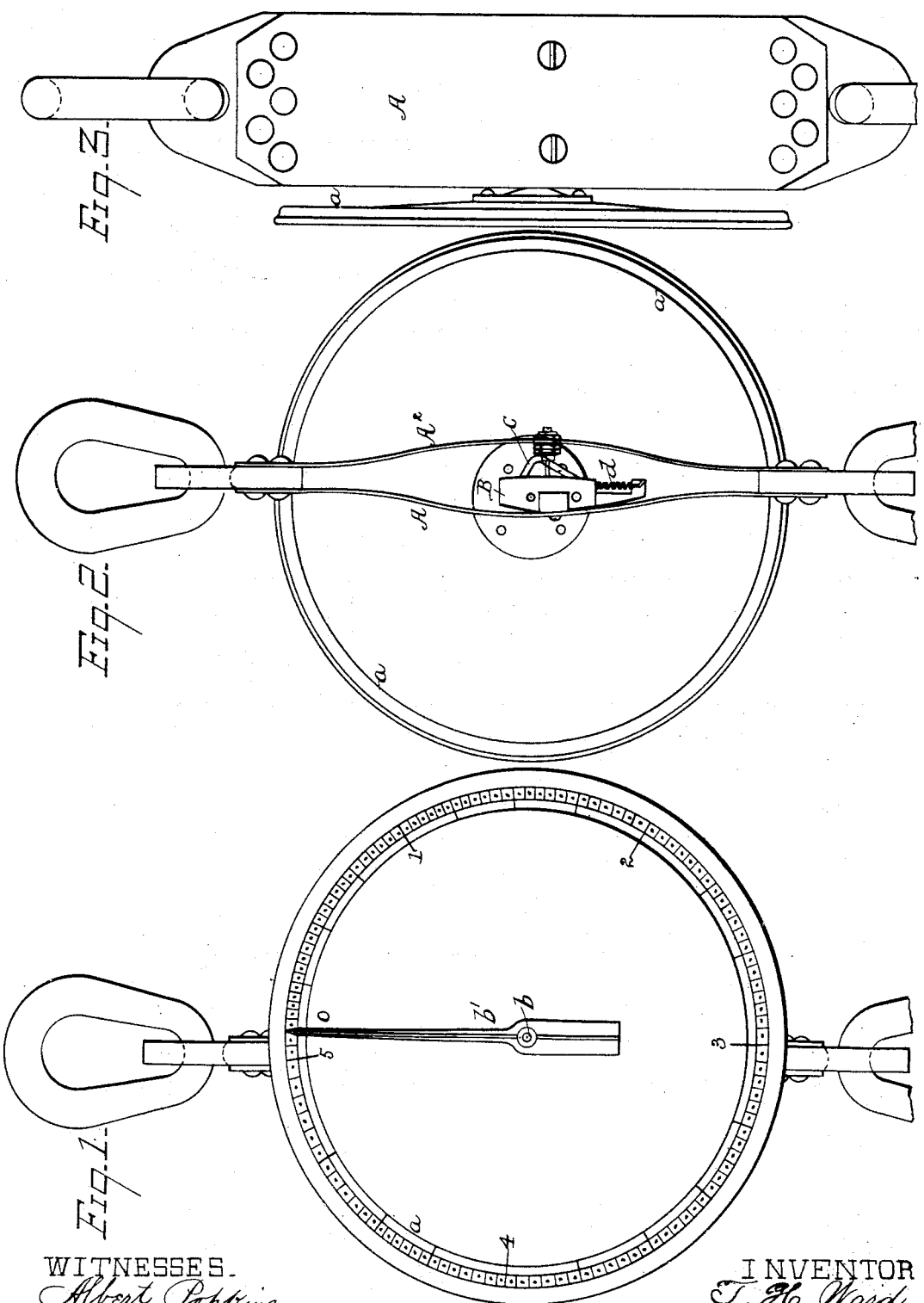
WITNESSES
Albert Popkins,
Jas. L. Skidmore.
INVENTOR
T. H. Ward
by his Attorneys.
Howson and Sons (No Model.) 9 Sheets—Sheet 2.
T. H. WARD.
WEIGHING AND INDICATING APPARATUS.

No. 342,550. Patented May 25, 1886.

Witnesses:
George E. Gibson
Harry Drury

Inventor:
T. H. Ward
by his attys.
Hobson & Imy (No Model.) 9 Sheets—Sheet 3.
T. H. WARD.
WEIGHING AND INDICATING APPARATUS.
No. 342,550. Patented May 25, 1886.
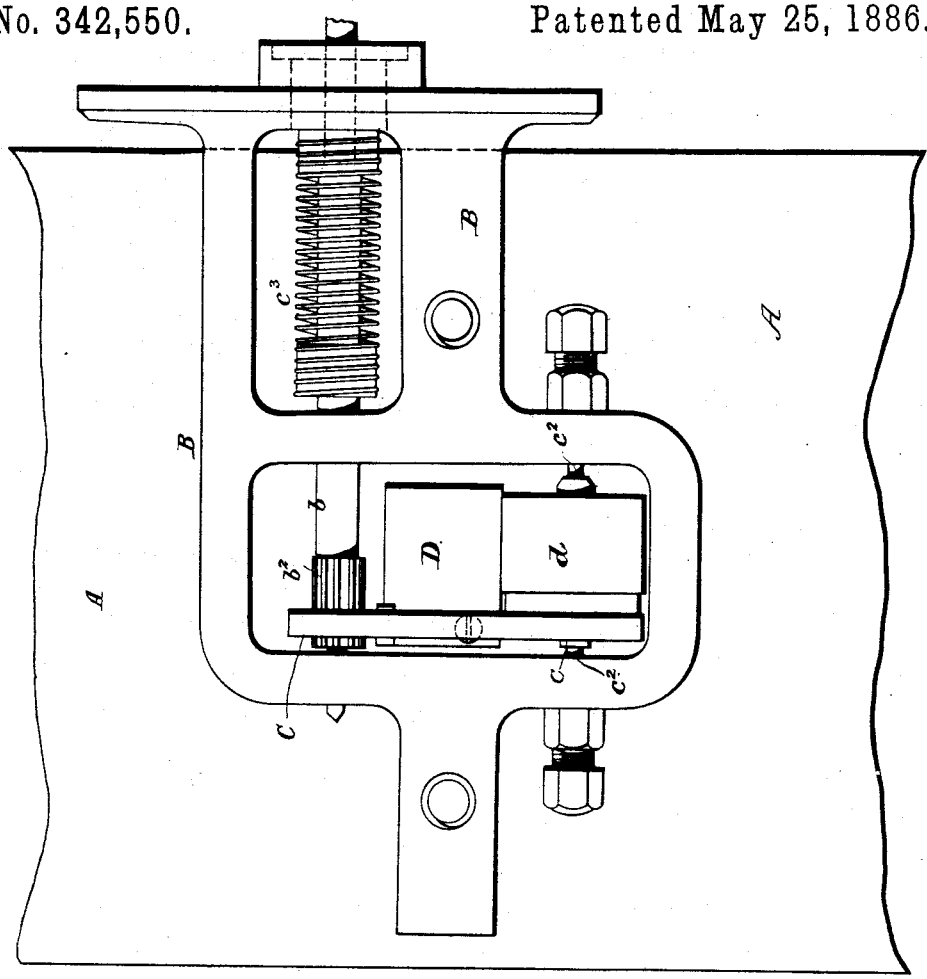
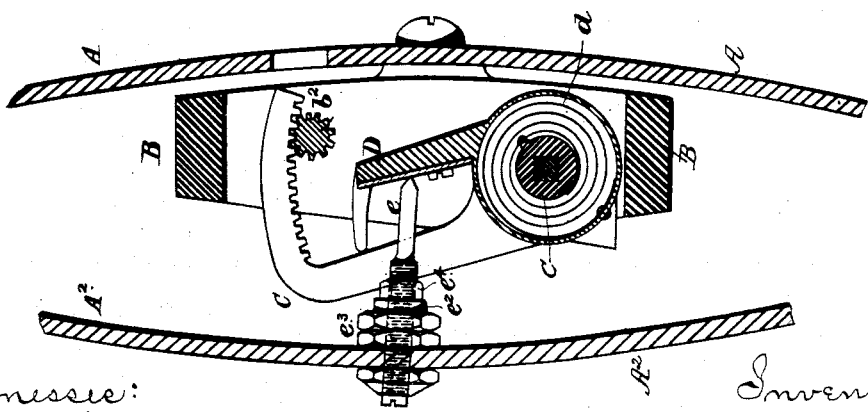
Witnesses:
George E. Sibson
Harry Drury
Inventor:
T. H. Ward
by his Attys.

(No Model.) 9 Sheets—Sheet 4.
T. H. WARD.
WEIGHING AND INDICATING APPARATUS.
No. 342,550. Patented May 25, 1886.
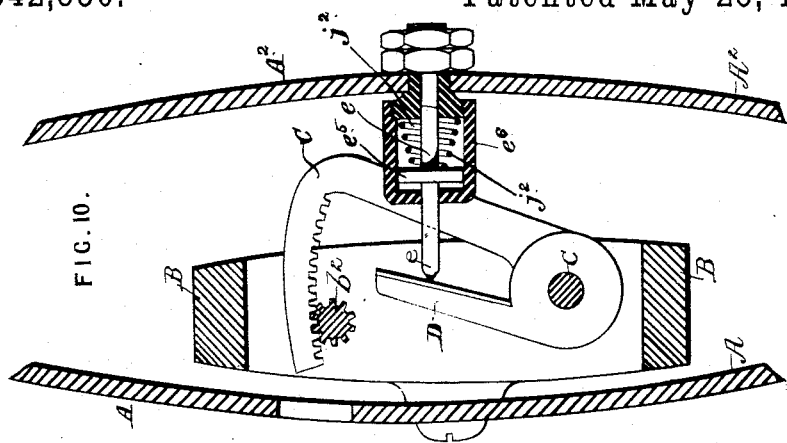
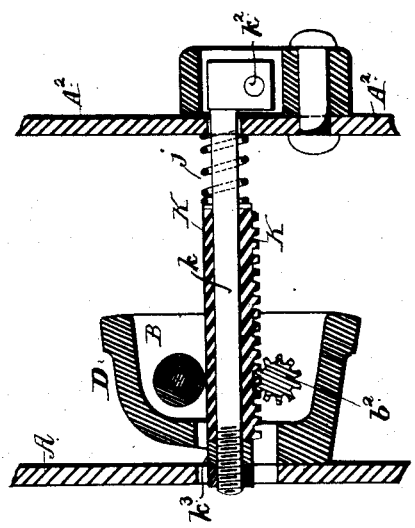
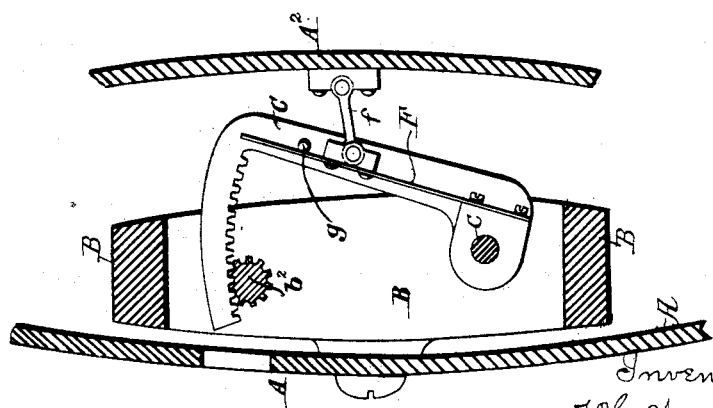
Witnesses:
George E. Sibson
Harry Drury
Inventor:
T. H. Ward
by his Attys
Howson & Son (No Model.) 9 Sheets—Sheet 5.
T. H. WARD.
WEIGHING AND INDICATING APPARATUS.
No. 342,550. Patented May 25, 1886.
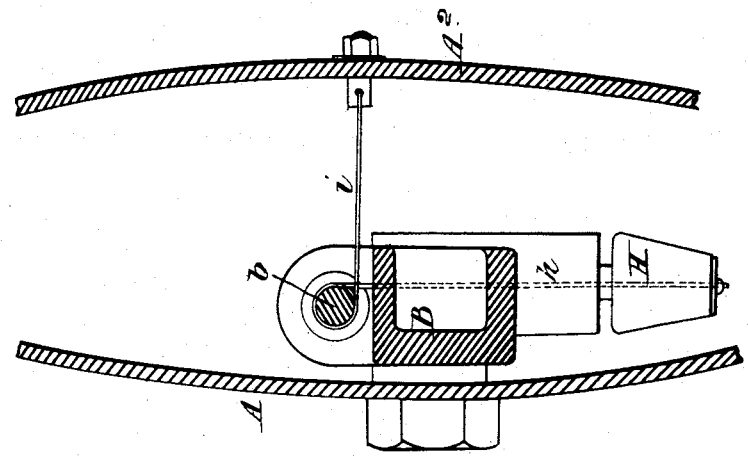
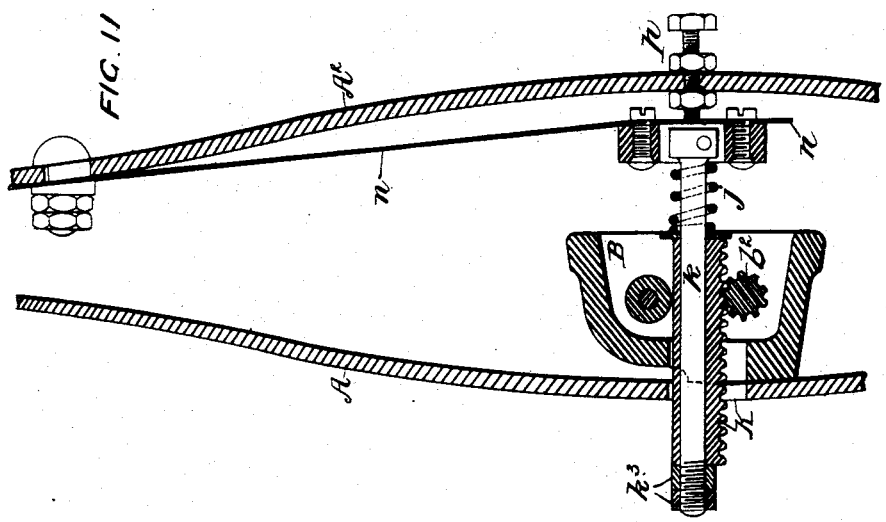
Witnesses:
George E. Gibson.
Harry Drury
Inventor:
T. H. Ward
by his Attys.
Howson & Sons (No Model.) 9 Sheets—Sheet 6.

T. H. WARD.
WEIGHING AND INDICATING APPARATUS.

No. 342,550. Patented May 25, 1886.

Witnesses:
George E. Gibson.
Harry Drury

Inventor:
T. H. Ward
by his attys.
Howson & Son (No Model.) 9 Sheets—Sheet 7.
T. H. WARD.
WEIGHING AND INDICATING APPARATUS.
No. 342,550. Patented May 25, 1886.
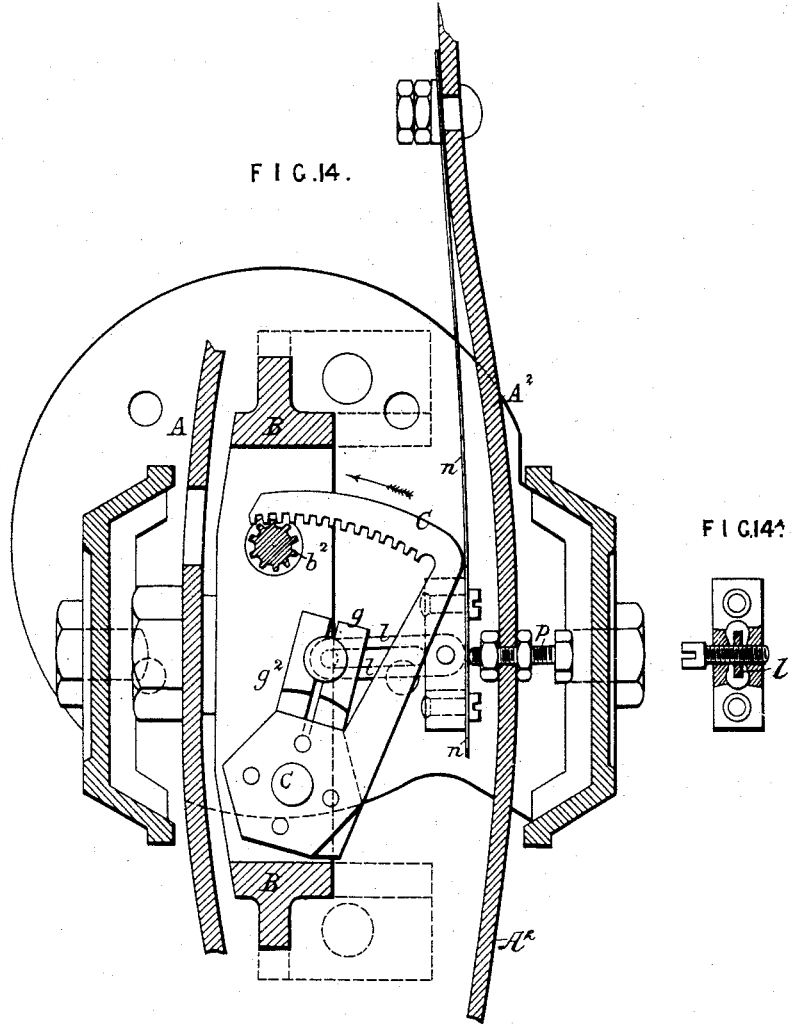

(No Model.) 9 Sheets—Sheet 8.

T. H. WARD.
WEIGHING AND INDICATING APPARATUS.

No. 342,550. Patented May 25, 1886.

Witnesses:
George E. S...
Harry Drury

Inventor
T. H. Ward
by his attys.
Howson & Son (No Model.)  9 Sheets—Sheet 9.

T. H. WARD.
WEIGHING AND INDICATING APPARATUS.

No. 342,550. Patented May 25, 1886.

Witnesses:
George E. Gibson
Harry Drury

Inventor:
T. H. Ward
by his Attys
Howson & Sons

United States Patent Office.

THOMAS HENRY WARD, OF TIPTON, COUNTY OF STAFFORD, ENGLAND.

WEIGHING AND INDICATING APPARATUS.

SPECIFICATION forming part of Letters Patent No. 342,550, dated May 25, 1886.

Application filed July 2, 1885. Serial No. 170,525. (No model.) Patented in England December 8, 1883, No. 5,678, and April 25, 1884, No. 6,804.

*To all whom it may concern:*

Be it known that I, THOMAS HENRY WARD, a subject of the Queen of Great Britain and Ireland, and a resident of Tipton, county of Stafford, England, have invented certain Improvements in Weighing and Indicating Apparatus, (for which I have obtained British Patents No. 5,678, dated December 8, 1883, and No. 6,804, dated April 25, 1884,) of which the following is a specification.

My invention relates more especially to weighing and indicating apparatus of the class for which I have obtained Letters Patent of the United States No. 304,587, dated September 2, 1884, and in which the dial and pointer are combined with spring-plates, the deflection of which under the weight or strain causes the indication.

The object of my invention is to so construct a weighing or indicating apparatus of this character as to prevent injury thereto from sudden strains or jars, and this object I attain by combining, with the spring-plates, dial, and pointer, an independently-yielding connection between the operative spring-plate and the pointer, as hereinafter described.

Figure 4:
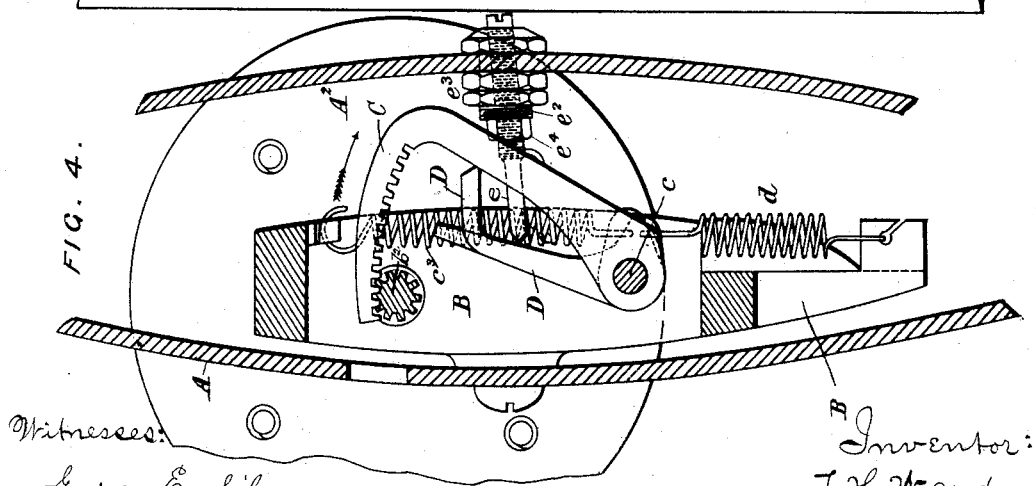
Figure 73:
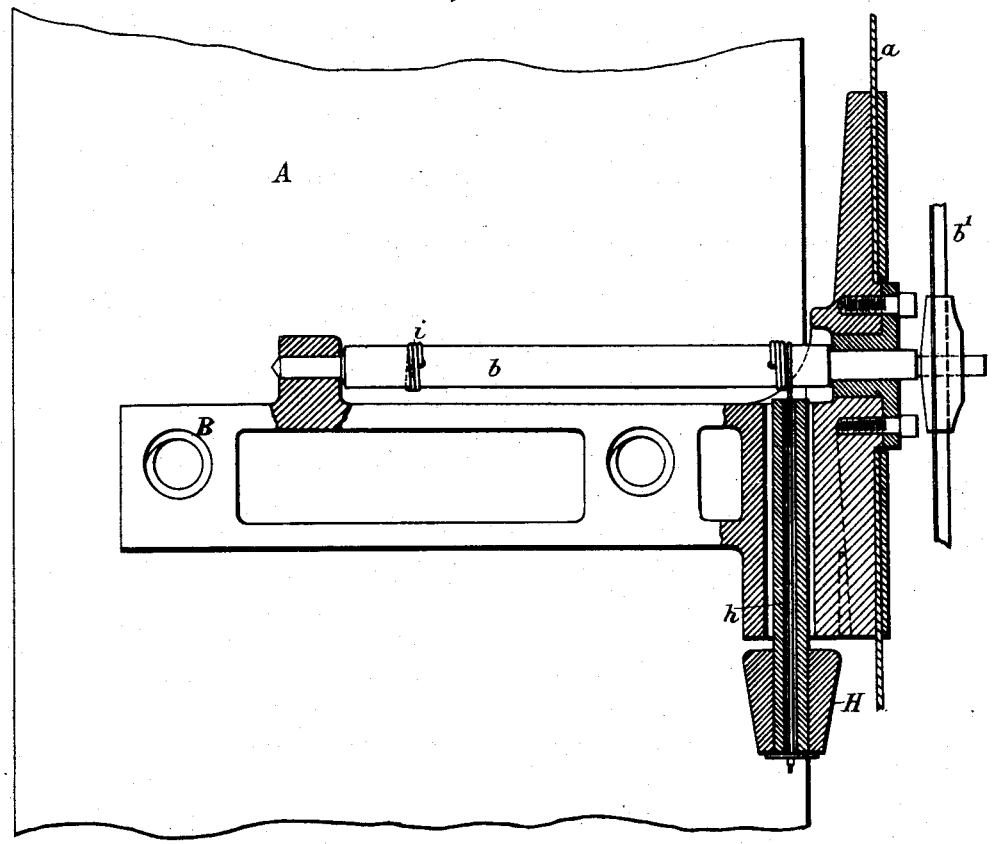
Figure 17:
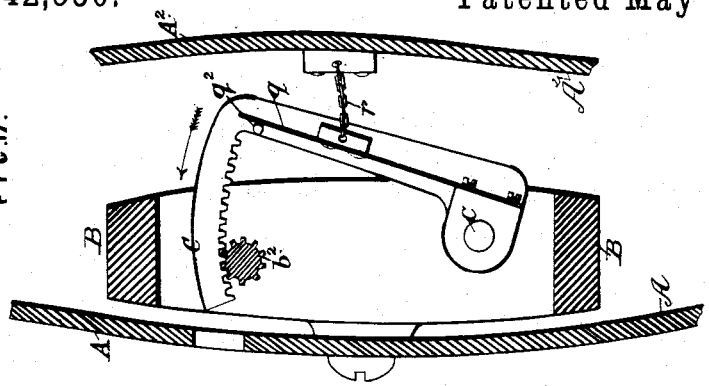
Figure 15:
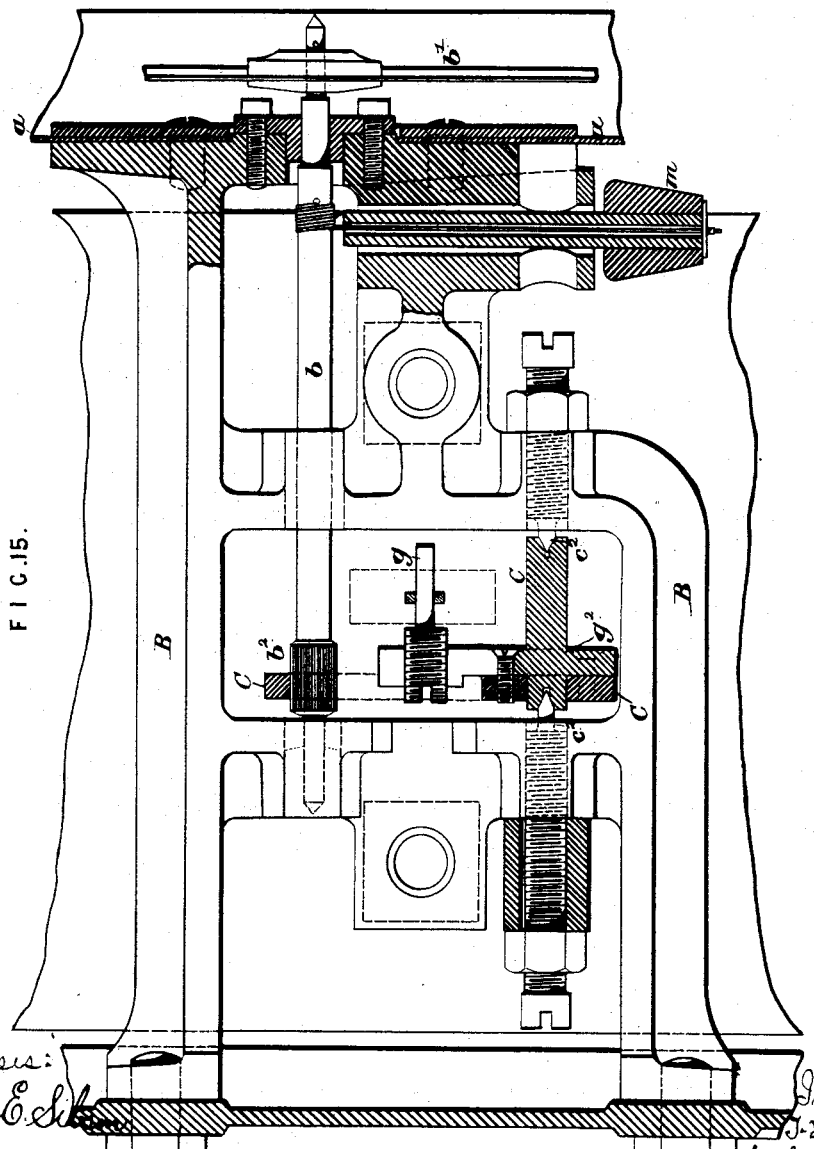

In the accompanying drawings, Figure 1 is a front elevation of a weighing apparatus to which my improvement may be applied. Fig. 2 is a rear view of the same. Fig. 3 is a side view. Fig. 4 is a vertical section, drawn to an enlarged scale, of the operative parts of the device. Fig. 5 is a corresponding side view with one of the spring-plates removed. Figs. 6 and 7 are corresponding views of a modification, and Figs. 8, 9, 10, 11, 12, 13, 14, 14$^a$, 15, and 16 are views of various modifications.

In its principal features the apparatus may be similar to the constructions illustrated and described in my aforesaid Patent No. 304,587, and in the construction illustrated in Figs. 1, 2, 3, 4, and 5 one of the blades or spring-plates, A, carries a frame, B, to which is attached a dial, $a$, and in which is mounted the axis $b$ of the pointer $b'$. This axis $b$ has a pinion, $b^2$, with which engages a toothed quadrant or rack, C. The latter is fixed upon a shaft, $c$, which is adapted to turn upon pivot-points $c^2$, Fig. 5. On the shaft $c$ of the quadrant C is free to turn a bearer or piece, D, which I term an "anvil," and which is caused by a spring or weight, $d$, to press against the quadrant or rack C, to cause it to remain in the normal position illustrated in Fig. 4. A spring or weight, $c^3$, of less power than the spring $d$, is combined with the quadrant C, so as to tend to move the quadrant or rack C in the reverse direction to that in which the spring $d$ tends to cause it to be pressed by the anvil D. The preponderance of the said spring $d$ causes a steady pull upon the rack C in the direction of the arrow, Fig. 4. A striker-hammer or bearing-pin, $e$, is connected to the other blade or spring-plate, A$^2$, so as to bear upon the anvil, as shown in Fig. 4.

When the machine is not subjected to sudden shocks or jars, but simply to the steady strain or weight of the article being weighed or tested, the hammer or striker pin $e$ presses upon the anvil D against the action of the spring $d$, and the quadrant or rack C, being thereby relieved from the action of said spring $d$, is acted upon by its spring $c^3$, and so operates the pinion $b^2$, to move the pointer $b'$ over the dial $a$, to indicate the weight or strain.

When the apparatus is subjected to a violent or sudden shock or jar, the striker-pin $e$, by its sudden action upon the anvil D, will separate the said anvil D momentarily from the quadrant or rack C, which will follow only by the small force exerted by the spring $c^3$. By means of this yielding connection, therefore, between the operative spring-plate and the axis of the pointer, the injurious effect of sudden shocks or jerks on the apparatus will be avoided, and the rebound also from the shock or jar will be prevented, or prevented to a considerable extent, from injuring the parts or gearing, transmitting the motion to the pointer in proportion to the power of the spring $c^3$. If the said spring be only of a power sufficient to operate the pointer, the rebound will have taken place to a great extent before the quadrant C comes into contact again with the anvil.

In order that the striker-pin $e$ may be caused to bear upon the anvil at a point which will give the proper leverage, I mount the said pin so as to be able to give it an eccentric adjustment, so that by turning it around I can vary the point of bearing on the anvil.

As will be seen on reference to Fig. 4, the striker-pin $e$ is threaded, and is adapted to a correspondingly-threaded opening in a bushing, $e^2$, which is secured to the spring-plate $A^2$ by suitable nuts, $e^3$. The opening in the bushing, through which the bearer-pin $e$ passes, is at an angle to the axis of the bush, as shown in Fig. 4, or, in other words, runs diagonally through it, so that the bearing-point of the hammer or pin $e$ is eccentric to the axis of adjustment of the bush on the plate $A^2$. Therefore, by loosening the nuts $e^3$ the bushing of the pin may be rotated to change the bearing-point of the pin $e$. The latter is secured in the bushing by a jam-nut, $e^4$, after it has been adjusted longitudinally. Owing to the ability to thus adjust the bearing-pin $e$, I can make the graduations of a number of dials from one matrix, and thus dispense with the necessity of marking each dial independently.

In the modification illustrated in Figs. 6 and 7, the springs $d$ and $c^3$ are somewhat differently arranged, the spring $c^3$ being a coiled spring, Fig. 7, which is connected to the axis $b$ of the pointer, while the spring $d$ is a volute spring fixed at one end to a box forming part of the anvil D and at the other end to the axis upon which the anvil turns. In other respects the device is substantially like that above described.

In the modification, Fig. 8, I have shown the quadrant or rack as provided with a spring, F, the free end of which is connected to the spring-plate $A^2$ by a link, $f$, while the plate A carries the frame B, on which the quadrant C is pivoted, as usual. The spring F will normally bear upon a stud, $g$, on the quadrant; but when the apparatus is subjected to sudden shocks, the spring F will yield and prevent injury to the machine in the manner described above with reference to Figs. 4 and 5.

In the modification, Fig. 9, I have illustrated the application of my present improvements to another construction of weighing apparatus illustrated and described in my above-cited Patent No. 304,587. The plate $A^2$ carries a rack, K, which gears into the pinion $b^2$ on the axis of the pointer, but I interpose a yielding connection between the rack and spring-plate $A^2$ by mounting the rack K to slide upon a rod, $k$, which is pivoted at $k^2$ to an attachment on the spring-plate $A^2$, and between the tubular rack K and the spring-plate I interpose a spiral spring, $j$, while at the opposite end the tubular rack is held on the rod by suitable nuts, $k^3$. When the apparatus is subjected to sudden shocks, the spring $j$ will be compressed between the plate $A^2$ and the end of the tubular rack K, the rod $k$ moving longitudinally inside the rack.

In Fig. 10 I have shown another construction, in which the anvil D is fixed to or forms part of the quadrant or rack C, and the striker-pin $e$ is provided with a piston or disk, $e^5$, adapted to a small cylinder or casing, $e^6$, which is carried by the plate $A^2$. A spring, $j^2$, is interposed between the disk $e^5$ and the end of the casing, so as to take up the sudden shocks or jars, as will be readily understood.

The construction illustrated in Fig. 11 is substantially similar to that illustrated in Fig. 9, except that instead of pivoting the bar $k$, which carries the tubular rack, to a fixed block on the spring-plate $A^2$, I pivot it to a block on an adjustable spring-plate, $m$, which is secured to the spring-plate $A^2$, and may be adjusted, as found desirable, by means of a set-screw, $p$.

In the modification illustrated in Figs. 12 and 13 the rack C and pinion $b^2$ on the axis of the pointer are dispensed with, and the axis $b$ is provided with a counter-weight or spring, H, a cord, $h$, coiled around the axis, giving a rotary strain on the axis $b$ equivalent to the action of the spring $c^3$ of the construction illustrated in Figs. 4 and 5. The spring-plate $A^2$ has a yielding connection with the axis $b$, through the medium of a cord or chain, $i$, one end of which is connected to the said plate $A^2$, and the other coiled around the axis and connected to it, as illustrated, so that when under the steady strain of the weight the spring-plates are deflected and the shaft $b$ is thereby relieved from the pull of the chain or cord $i$ the weight or spring H will turn the pointer to a corresponding extent. The yielding connection between the axis of the pointer and the spring-plate, formed by the cord $i$, will prevent the injurious action of sudden strains upon the working parts of the apparatus.

In the construction shown in Figs. 14, 14$^a$, and 15 the axis $b$ of the pointer is shown as provided with a weight, H, similar to that described with reference to Figs. 12 and 13, and a quadrantal rack, C, pivoted to the block B, carried by the spring-plate A, gears into a pinion, $b^2$, on the said axis $b$. Secured to or forming part of the rack C or its axis is a piece, $g^2$, which carries an adjustable pin, $g$, connected by a slotted link, $l$, to the spring-plate $A^2$, through the medium of an adjustable plate, $n$, as described with reference to Fig. 11. The link $l$ is connected to a block on the adjustable plate $n$, as illustrated in Fig. 14$^a$, and the pin $g$ is free to play in the slot of the link $l$, but normally bears against the end of the latter, as illustrated in Fig. 14, so that steady strains will be transmitted to move the pointer over the dial; but when the apparatus is subjected to sudden shocks, and the plate $A^2$ thereby deflected, the link $l$ will momentarily slide on the pin or stud $g$.

As seen in Fig. 14, the stud or pin $g$ is mounted eccentrically in the piece $g^2$, so as to allow of a limited adjustment by rotating the pin in the piece $g^2$.

Figure 16:
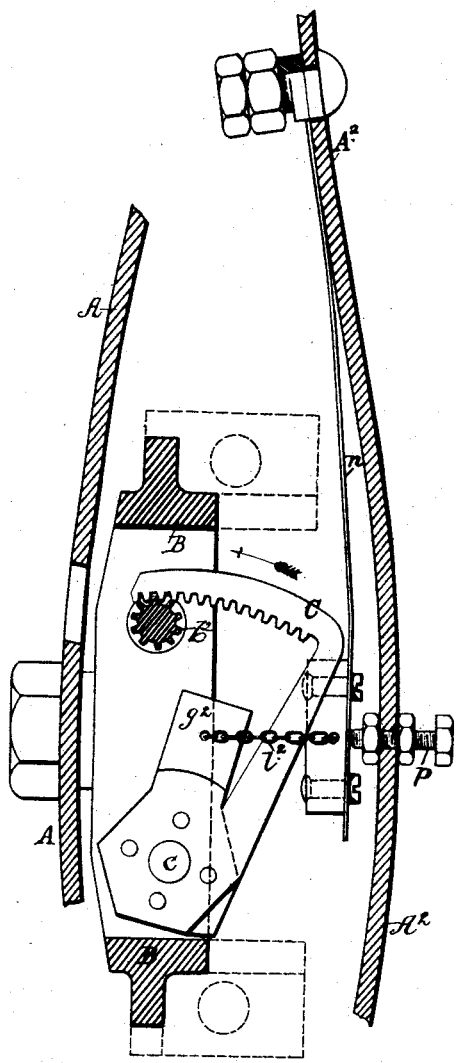

Instead of the slotted link $l$, other forms of yielding connection between the plate $A^2$ and the quadrantal rack may be employed. For instance, in Fig. 16 I have shown the slotted link or loop as replaced by a short chain, $l^2$, the operation of which is substantially similar to that of the link.

Any of the above-described constructions will give a cheap, reliable, and light-weighing machine, which is not liable to be injured by sudden shocks or strains, and where the spring-plate $n$ is used the injurious effects of the actions from such sudden shocks will be avoided. This spring-plate $n$ may be replaced by a spring or springs in any other position which will give the required yielding effect against the rebounding action due to sudden shocks.

The spring blades or plates may be of any suitable construction and be made of any desired number of leaves. They may be bowed outward or inward, or may be tempered flat and be deflected from their natural position by means of a spiral spring or springs, or be otherwise arranged, as found desirable.

I claim as my invention—

1. The herein-described indicating apparatus, comprising deflecting spring-plates, a dial and pointer operated thereby, and an independently-yielding connection between the spring-plates and pointer to relieve from sudden shocks, substantially as set forth.

2. The combination of the deflecting spring-plates of an indicating apparatus, a pointer and dial carried by one of said plates, and a rack carried or moved by the other plate, with an independently-yielding connection between the rack and its plate, as and for the purpose set forth.

3. The combination of the deflecting-plates of an indicating apparatus, a dial, pointer, and pinion carried by one of the plates, with a rack gearing with the pinion, a yielding spring, and a bearing-pin, $e$, eccentrically adjustable, substantially as described.

4. The combination of the deflecting-plates of an indicating apparatus, a dial, pointer, and pinion carried by one of said plates, with a rack gearing with said pinion and having an anvil, D, a bearing-pin, $e$, carried by the other deflecting-plate, and a yielding connection between the latter and the rack, all substantially as specified.

In testimony whereof I have signed my name to this specification in the presence of two subscribing witnesses.

THOMAS HENRY WARD.

Witnesses:
  EDMUND HOWE,
    *The Quarries, W. Dudley.*
  OLIVER HOWE,
    *Woodsetton, W. Dudley.*